Dec. 24, 1968 A. L. HOPPER 3,417,698

ELECTRO-OPTICAL DEVICE

Filed July 31, 1950

Inventor

Andrew L. Hopper

By G. J. Kessenich, J. H. Church & M. L. Libman
Attorneys

United States Patent Office 3,417,698
Patented Dec. 24, 1968

3,417,698
ELECTRO-OPTICAL DEVICE
Andrew L. Hopper, Summit, N.J., assignor, by mesne assignments, to the United States of America as represented by the Secretary of the Army
Filed July 31, 1950, Ser. No. 176,865
2 Claims. (Cl. 102—70.2)

This invention relates to photoelectric fuse and more particularly to an arrangement for preventing sunfiring of photoelectric fuses.

A photoelectric fuse is one which is actuated by the effect of the target on a photoelectric cell in the fuse. When the target is sufficiently close to the fuse and in the field of view of the fuse, the projectile is detonated. A known type of photoelectric fuse has an annular lens in the nose, so that it sees an annular field of view directed laterally outward and inclined slightly forward, corresponding to the burst pattern of the projectile. When a solid object, such as an airplane enters the field of view, it obstructs some light, consequently the total light incident on the photoelectric cell is reduced. The consequent decrease in output current of the cell is transmitted to an amplifier as a signal and used to fire thyratron when a predetermined minimum percentage change in light level occurs.

A fuse of the above described type is subject to the disadvantages that it will fire prematurely if, after arming, the field of view appears to include the sun or to view the sky at a small sun angle. This premature firing may be due to rapid varying of the sun angle by the yawing of the projectile in flight, which produces abrupt changes in photoelectric cell output. This phenomenon is called sunfiring.

It is the object of my invention to prevent sunfiring in photoelectric fuses. I accomplish this by providing a second photoelectric cell or sun guard cell which sees the same general field of view as the main photoelectric cell, but overlaps the field of view of the main photocell and which is used to bias off the thyratron grid so that it cannot fire when the main cell sees the sun. The sensitivity of this sun guard cell is so adjusted that it does not interfere with normal operation of the fuse, but requires a very high intensity of light, such as is furnished when looking at or near the sun, to cause it to operate.

The specific nature of the invention, as well as other objects and advantages thereof, will clearly appear from a description of a preferred embodiment as shown in the accompanying drawing in which.

Figure 1:
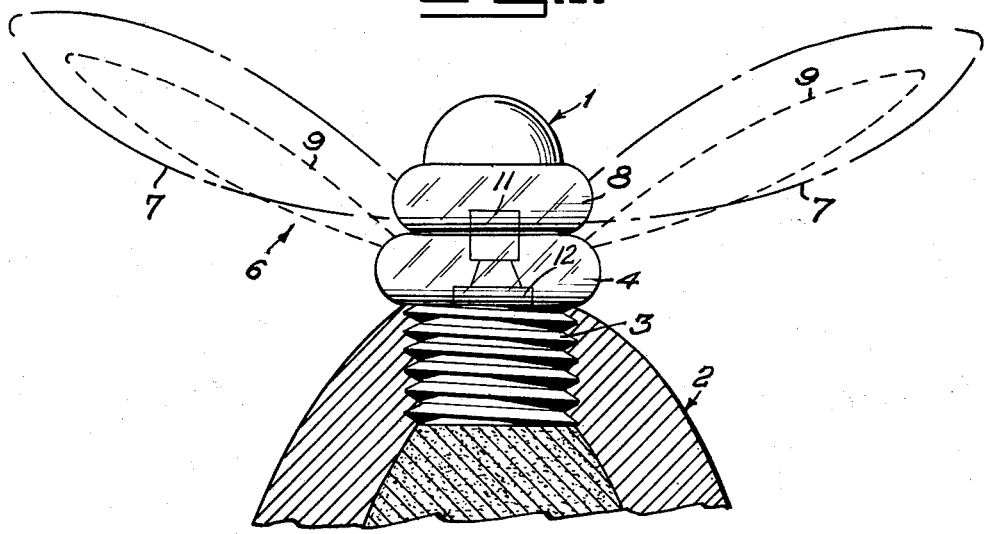
FIG. 1 is a schematic view of a projectile equipped with a photoelectric fuse according to my invention.
Figure 2:
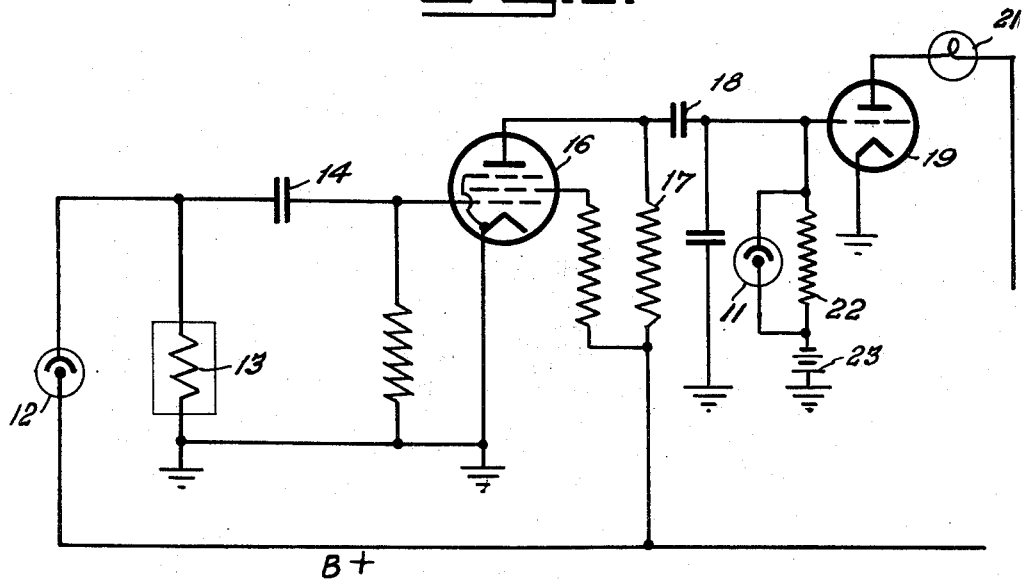
FIG. 2 is a schematic circuit diagram illustrating the principle of my invention.

In the figures, photoelectric fuse 1 is mounted in the nose of the projectile 2 and secured by threads 3 or any other suitable means. Near the forward portion of the fuse is an annular lens 4 which collects light from an annular section indicated by dash line 9, the variation of sensitivity with direction being indicated by the dash line. According to my invention a second annular lens 8 is provided in advance of the first annular lens and is so arranged that its field of view definitely overlaps that of the first lens as indicated by the intensity pattern 7. Light collected by lens 8 is thrown on a photocell 11 and light collected by lens 4 falls on another photocell 12.

Cell 12 and a resistor 13 are connected in series across a source of B voltage. When the fuse passes a target, the voltage across resistor 13 changes because of the rise in impedance of the photocell as the light thereon is reduced. This change in voltage is transmitted through condenser 14 to the grid of an amplifier tube 16 which develops across its plate resistor 17 a resultant amplified pulse, which is transmitted through condenser 18 to the grid of thyratron 19 to fire the thyratron and thereby set off squib 21 to detonate the explosive charge in projectile 2. The thyratron is biased to its normal operative voltage by a properly selected value of battery 23 to make the grid of thyratron 19 negative with respect to the filament. The sun guard tube 11 is placed across grid resistor 22 and the two are so adjusted as to value that upon receiving a light signal of sufficiently high value, such as occurs when viewing the sun directly or at a small angle, resulting lowered impedance of tube 11 will act as a shunt across resistor 22 thereby reducing any signal voltage from main photocell 12 below the amplitude necessary to fire the negatively biased thyratron as long as this condition continues to exist. As soon as the photocell has moved so that its filed of view no longer embraces the critical angle, the cell will immediately return to its original condition wherein it is sensitive to signals from main photocell 12.

It will be apparent that the embodiments shown are only exemplary and that various modifications can be made in construction and arrangement within the scope of my invention as defined in the appended claims.

I claim:

1. A photoelectric fuse comprising: first light-collecting means for collecting light from a predetermined first field of view with respect to the fuse; first photoelectric means for producing a first voltage varying with the amplitude of the light so collected; first differentiator means for differentiating said voltage; amplifier means for amplifying the output of said first differentiator; a thyratron, a first capacitor connecting the output of said amplifier to the grid of said thyratron; a resistor and a bias means connected between the gride and cathode of said thyratron; second light-collecting means for collecting light from a field of view including but greater than said first field of view; and a photocell responsive to light from said second light-collecting means, said photocell shunting said resistor, the impedance of said photocell decreasing with increase in light, so that large amounts of light striking said second light-collecting means render the fuse unresponsive to changes in the light collected by said first light-collecting means.

2. The invention according to claim 1, said first and second light-collecting means comprising two annular lenses located near the end of said fuse.

References Cited

UNITED STATES PATENTS 2,060,205   11/1936   Hammond _____ 102—70.2

VERLIN R. PENDEGRASS, *Primary Examiner.*